United States Patent
Chen (10) Patent No.: US 12,113,376 B2
(45) Date of Patent: *Oct. 8, 2024

(54) SYSTEM AND METHOD FOR WIRELESS INTERCOMMUNICATION AND POWER DELIVERY

(71) Applicant: Comcast Cable Communications, LLC, Philadelphia, PA (US)

(72) Inventor: Michael Chen, Wallingford, PA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/662,307

(22) Filed: May 6, 2022

(65) Prior Publication Data

US 2022/0263353 A1 Aug. 18, 2022

Related U.S. Application Data

(63) Continuation of application No. 16/703,638, filed on Dec. 4, 2019, now Pat. No. 11,349,354, which is a
(Continued)

(51) Int. Cl.
*H02J 50/90* (2016.01)
*H02B 5/00* (2006.01)
*H02J 7/00* (2006.01)
*H02J 50/05* (2016.01)
*H02J 50/12* (2016.01)
*H02J 50/20* (2016.01)
*H02J 50/60* (2016.01)
(Continued)

(52) U.S. Cl.
CPC ............ *H02J 50/90* (2016.02); *H02J 7/0029* (2013.01); *H02J 50/05* (2016.02); *H02J 50/12* (2016.02); *H02J 50/20* (2016.02); *H02J 50/60* (2016.02); *H02J 50/80* (2016.02); *H04B 5/79* (2024.01); *H04B 7/0617* (2013.01); *H04W 52/0209* (2013.01); *H02J 7/00* (2013.01); *H02J 7/00045* (2020.01)

(58) Field of Classification Search
None
See application file for complete search history.

(56) References Cited

U.S. PATENT DOCUMENTS

2006/0113381 A1* 6/2006 Hochstein ........ G06K 19/07345
235/382
2010/0033021 A1* 2/2010 Bennett ................. H02J 50/402
307/104
(Continued)

FOREIGN PATENT DOCUMENTS

WO 2015/132827 A1 9/2015
WO 2016/109314 A2 7/2016

OTHER PUBLICATIONS

US Patent Application filed on Dec. 4, 2019, entitled "System and Method for Wireless Intercommunication and Power Delivery", U.S. Appl. No. 16/703,638.

*Primary Examiner* — Jared Fureman
*Assistant Examiner* — Aqeel H Bukhari
(74) *Attorney, Agent, or Firm* — BakerHostetler (57) ABSTRACT

A wireless signal may supply a wireless power signal to a device to power the device for an authentication. If the device is authenticated, the wireless signal may be adjusted to provide power to the device. If the device is not authenticated, the wireless signal may be adjusted to avoid providing power to the device.

19 Claims, 11 Drawing Sheets

Related U.S. Application Data continuation of application No. 15/209,249, filed on Jul. 13, 2016, now Pat. No. 10,536,041.

(51) Int. Cl.

| | |
|---|---|
| *H02J 50/80* | (2016.01) |
| *H04B 5/79* | (2024.01) |
| *H04B 7/06* | (2006.01) |
| *H04W 52/02* | (2009.01) |

(56) References Cited

U.S. PATENT DOCUMENTS

| | | |
|---|---|---|
| 2011/0115431 A1 | 5/2011 | Dunworth et al. |
| 2011/0156640 A1 | 6/2011 | Moshfeghi |
| 2012/0169541 A1 | 7/2012 | Singh |
| 2012/0268238 A1 | 10/2012 | Park et al. |
| 2012/0274154 A1* | 11/2012 | DeLuca .......... H02J 50/27 307/149 |
| 2013/0093257 A1 | 4/2013 | Goto |
| 2014/0125459 A1 | 5/2014 | Sabahialshoara et al. |
| 2014/0159647 A1* | 6/2014 | Nishioka .......... H02J 7/02 307/104 |
| 2014/0361735 A1 | 12/2014 | Li et al. |
| 2016/0094092 A1* | 3/2016 | Davlantes .......... H01Q 3/36 307/104 |
| 2016/0221459 A1 | 8/2016 | Jung et al. |
| 2016/0373167 A1 | 12/2016 | Nishioka |
| 2017/0146635 A1 | 5/2017 | Basha et al. |
| 2017/0302109 A1 | 10/2017 | Lee et al. |
| 2018/0159338 A1 | 6/2018 | Leabman et al. |

\* cited by examiner

SYSTEM AND METHOD FOR WIRELESS INTERCOMMUNICATION AND POWER DELIVERY

CROSS REFERENCE TO RELATED APPLICATIONS

This application is a continuation application of U.S. patent application Ser. No. 16/703,638 filed on Dec. 4, 2019, now U.S. Pat. No. 11,349,354, issued on May 31, 2022, which is a continuation application of U.S. patent application Ser. No. 15/209,249 filed on Jul. 13, 2016, now U.S. Pat. No. 10,536,041, issued on Jan. 14, 2020, which are hereby incorporated by reference in their entirety.

BACKGROUND

There has been a demonstrable increase in recent years in the number and types of devices that are adapted with wireless communication capabilities. For example, sensor devices, mechanical equipment, and stand-alone appliances are just some of the devices that traditionally have not had communication capabilities but which are now being adapted to perform wireless communications. The Internet of Things (IoT) is a term that has been used to refer to a network formed from the numerous devices and objects, i.e., things, that now have the capability to exchange data. Experts estimate that the IoT will consist of almost 50 billion objects by 2020.

Battery life is an ever-present problem for many of the devices that are now being adapted with wireless communication capabilities. Constraints on the size and weight of many of these devices restrict the size of the batteries, which, in turn, limits the battery's capacity.

SUMMARY

Systems and methods for wirelessly supplying power to remote devices are described. In an example embodiment, a wireless power supply transmits a wireless power signal which may be, for example, a wireless signal, such as a Wi-Fi signal, to a device so that the device has or obtains sufficient power to authenticate with the system controlling the wireless power supply. The authentication can be done with the wireless power supply or with another wireless transceiver. If the device is authenticated, the wireless power supply can adjust the wireless signal in order to provide power to the device. If the device can not be authenticated, then the wireless power supply can adjust the wireless signal in order to avoid providing power to the device.

The adjustment can be spatial or temporal. For example, in a spatial adjustment the shape of the supplied signal beam can be adjusted. In a temporal adjustment, the signal beam can be turned on for a longer or shorter time period. For example, the power signal can have a duty cycle that may be increased when the right indication is received.

In an example scenario, the wireless power supply adjusts the signal so that it reaches the particular device that has been authenticated. If the device is not authenticated, the wireless power signal may be adjusted to avoid providing power to the device.

Embodiments also concern providing indications to a sender of wireless signals so that these wireless signals can be adjusted. An indication can be sent to the sender related to strength of multiple signals to allow the sender to adjust the signals. Alternately, location info may be provided from the device to the sender.

Additional advantages will be set forth in part in the description which follows or may be learned by practice. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION OF ILLUSTRATIVE EMBODIMENTS

The technology to supply power wirelessly to devices, such as IoT devices, using the same frequencies and antennas as those used for intercommunication is rapidly becoming a reality. Devices that are adapted to receive power via an antenna may not require a battery at all. However, where devices are adapted to receive power via an antenna, it is desirable to maintain some degree of control over which devices in an area consume wireless power. For example, if there are three wireless devices in a physical area, it may be desired to communicate power to only one of the three devices.

Supplying power wirelessly has been attempted over short distances. For example, systems have attempted inductive charging of toothbrushes and cellphones over short distances. However, inductive charging techniques are limited to extremely short distances, e.g., the device must be resting upon or inches above the charging base. Moreover, inductive charging techniques provide no ability to authenticate the particular device that receives the charge. For example, existing techniques lack the ability to charge only your toothbrush (as opposed to another's toothbrush) or only your smart phone (as opposed to someone else's).

Disclosed herein are systems and methods for delivering a wireless power signal to a device in order to power the device for an authentication. If the device is authenticated, a wireless power signal is adjusted to provide power to the particular device. If the device is not authenticated, the wireless power signal may be adjusted to avoid providing power to the particular device.

The wireless power signal transmitter can be part of a system with another wireless data transceiver that receives requests from low power devices. For example, the device without a dedicated power supply can communicate with Bluetooth low energy (BLE) or ZigBee (an IEEE 802.15.4-based specification) transceiver. The wireless power signal transmitter can then be alerted by the another wireless data transceiver. For example, the another wireless data transceiver can be connected to the wireless power signal transmitter using a network connection or Internet of Things (IoT) hub. In one example, wireless power, such as power provided on a WiFi band, can provide enough energy for device to emit BLE or ZigBee signals that a BLE or ZigBee hub used for IoT can relay back to the wireless power signal transmitter.

Figure 1:
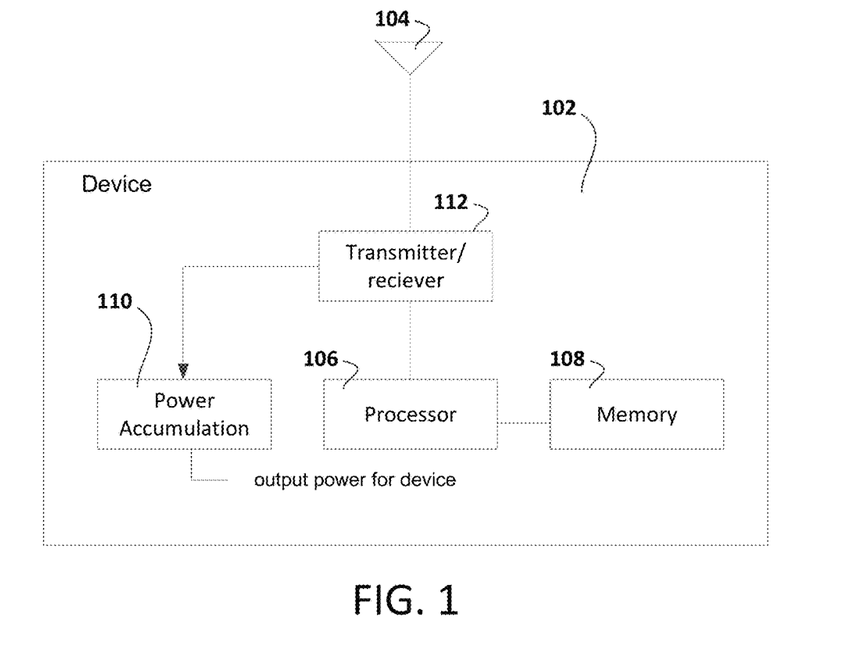
FIG. 1 is a block diagram depicting an example device without a dedicated power supply.

FIG. 1 illustrates an exemplary device 102 suitable for receiving power wirelessly. The device 102 may be a computing device, such as, an Internet of Things (IoT) device or another user device. In an example embodiment, the device 102 may be a wireless power consuming device without its own power supply or battery. In another example scenario, the device 102 may be a device without a dedicated power supply that relies upon other devices to provide power to it. In another embodiment, the device 102 may have a power supply that has limited or depleted available power. The device 102 may be adapted to communicate using the Internet Protocol (IP) and, as such, may be considered part of the Internet of Things. The device 102 may be adapted for any suitable purpose including, for example, as a sensor such as those used for sensing light, temperature, accelerometer or other relevant environmental characteristic.

As shown in FIG. 1, device 102 comprises an antenna 104 that is adapted to receive and transmit signals in cooperation with a transmitter/receiver unit 112. The antenna 104 and the transmitter/receiver unit 112 may be controlled by processor 106 to receive wireless signals that provide power to device 102. The wireless signals may be any signals that are suitable to provide power to device 102 including, for example, radio-wave, electromagnetic induction, magnetic resonance, or capacitive coupling. In an example scenario, the antenna 104 is adapted to receive wireless signals, such as WiFi signals. The power accumulation unit 110 is adapted to obtain power from the received signal. Power accumulation unit 110 may be adapted to derive power in any suitable manner. In an example embodiment, power accumulation unit 110 may be adapted to derive power using resonant inductive coupling.

Referring to FIG. 1, the transmitter/receiver 112 is communicatively coupled with the processor 106. The processor 106 is communicatively coupled to computer-readable medium or memory 108 which has stored therein instructions that when executed by the processor 106 cause the processor 106 control the various components of device 102 so as to operate as described herein.

Figure 2:
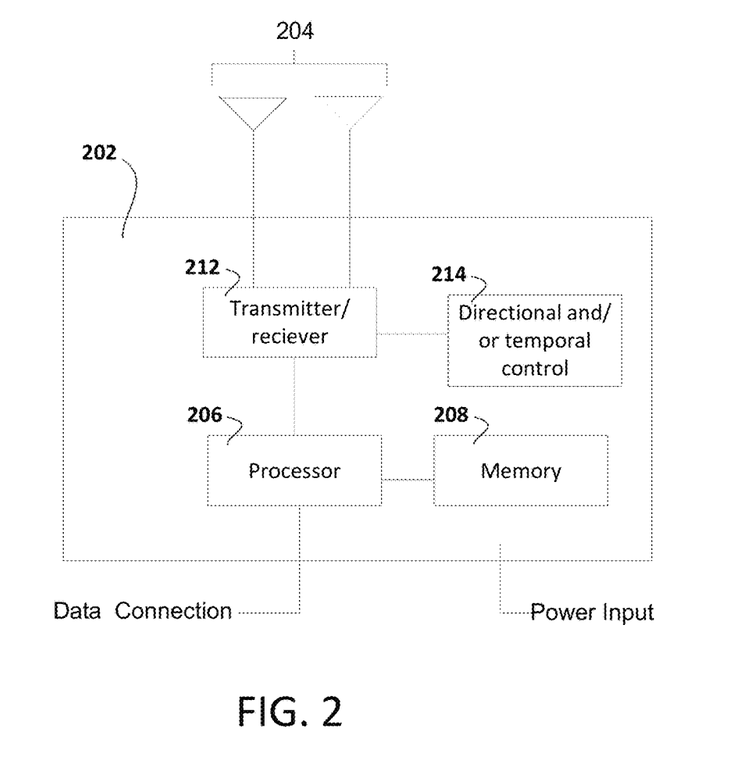
FIG. 2 is a block diagram illustrating an example wireless power supply unit.

FIG. 2 illustrates an exemplary wireless power supply unit 202 adapted to communicate or deliver power wirelessly to devices such as that depicted in FIG. 1. The wireless power supply unit 202 may be any device that is suitable to wirelessly communicate power. In an example embodiment, the wireless power supply unit 202 may be a dedicated wireless supply unit. In another embodiment, the wireless power supply unit 202 may be an access point that inter-communicates data with other devices, such as a wireless access point, in addition to providing power wirelessly.

Referring to FIG. 2, the wireless power supply unit 202 includes an antenna 204. In an example embodiment, the antenna 204 is adapted to spatially arrange its output signal using beamforming techniques. Beamforming is used to focus signals toward certain physical areas or regions. In an example scenario, beamforming may be used to focus signals toward a particular area where particular devices are located. Beamforming concentrates signal transmission so that more of the signal reaches targeted devices.

Beamforming, which is sometimes referred to as spatial filtering, is a signal processing technique that typically uses a sensor array, such as multi-antenna array 204, for directional signal transmission and/or reception. This may be achieved by combining elements in a phased array in such a way that signals at particular angles (and thus regions in space) experience constructive interference while others experience destructive interference. The improvement compared with omnidirectional reception/transmission is known as the receive/transmit gain (or loss). Such beamforming techniques have been devised to enhance wireless data delivery to devices. However, beamforming techniques may be leveraged to enhance wireless power delivery and minimize transmission power waste. Referring to FIG. 2, the directional control logic 214 (or processor 206), which is communicatively coupled with transmitter/receiver 212, may be used to control the signals at the multi-antenna array 204.

Referring to FIG. 2, the wireless power supply unit 202 may include one or more processors 206, which may execute instructions of a computer program to perform any of the features described herein. The instructions may be stored in any type of computer-readable medium or memory 208, to configure the operation of the processor 206. For example, instructions may be stored in a read-only memory (ROM), random access memory (RAM), hard drive, removable media, such as a Universal Serial Bus (USB) drive, compact disk (CD) or digital versatile disk (DVD), floppy disk drive, or any other desired electronic storage medium. Instructions may also be stored in an attached (or internal) hard drive.

The wireless power supply unit 202 may be a uniprocessor system including one processor or a multiprocessor system including several processors (e.g., two, four, eight, or another suitable number). The processors may be any suitable processors capable of executing instructions. For example, in various aspects, the processor(s) may be general-purpose or embedded processors implementing any of a variety of instruction set architectures (ISAs), such as the x86, PowerPC, SPARC, or MIPS ISAs, or any other suitable ISA. In multiprocessor systems, each of the processors may commonly, but not necessarily, implement the same ISA. The wireless power supply unit 202 may be or may be associated with a computing device may include one or more output devices, such as a display (not shown) and may include one or more output device controllers, such as a video processor. There may also be one or more user input devices, such as a remote control, keyboard, mouse, touch screen, microphone, etc.

When the wireless power supply unit 202 acts as an access point, data may be received from and sent to devices such as device 102 without a dedicated power supply. The wireless power supply unit 202 may also include one or more network interfaces, such as input/output circuits (e.g., a network card) to communicate with a network. The network interface may be a wired interface, wireless interface, or a combination of the two. In some embodiments, the network interface may include a modem (e.g., a cable modem), and the network.

As discussed above, another wireless data transceiver can be associated with the wireless power supply unit 202. The another wireless data transceiver can include components similar to that shown in FIG. 2 with respect to wireless power supply unit 202. Such a wireless data transceiver can communicate with the device 102 using a low power protocol such as BLE or ZigBee used in IoT communications.

Figure 3:
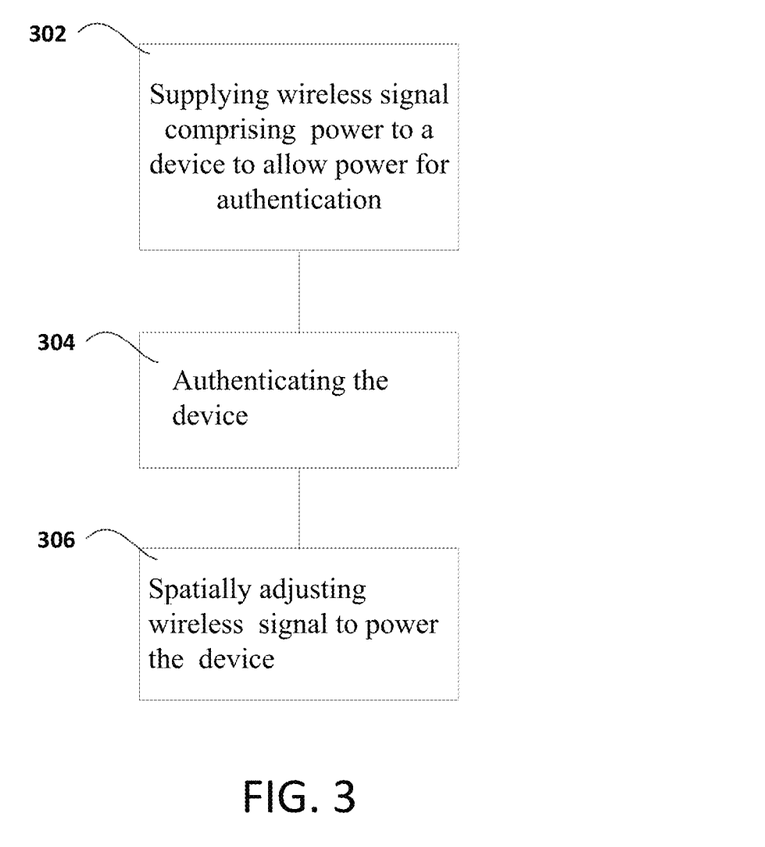
FIG. 3 is a flow diagram depicting example processing for authenticating and powering a device.

FIGS. 3, 4, 6A, 6B, 8, and 10 and other portions of the disclosure illustrate operations and methods according to some aspects of the disclosure. The methods may be performed by anetwork operator, monitor or user, for example. Decision making for the steps of FIGS. 3, 4, 6A, 6B, 8, and 10 and other disclosed methods can be local at the wireless power supply unit 202 (or another transceiver such as a BLE or ZigBee transceiver). Alternately, decision making can be remotely done or enhanced with information that is provided from a remote location, such as from a logic controller that can be implemented by a computing device and/or software. FIG. 3 depicts a flow diagram of an example process for wirelessly communicating or otherwise delivering power to a device. As shown, at block 302, a wireless signal is supplied to at least one device in order for the device(s) to have power sufficient for performing a particular task, such as an authentication procedure.

Power can be provided to devices to allow for the device to be powered for an authentication process. For example, the wireless power supply unit 202 can sweep with power sufficient for authentication but not for full operation of the device. Alternately, the device may have been initially authenticated, but lost power and now has to be re-authenticated.

In an example embodiment, the wireless power supply unit 202, which may be a wireless data access point like a Wi-Fi access point, supplies a wireless signal that is received at the device 102. The wireless signal is conditioned and provided such that the signal supplies power to device 102, for example, so that device 102 is able to perform an authentication procedure. After being powered by wireless power supply unit 202, the device 102 can authenticate with d wireless power supply unit 202 or can authenticate with another transceiver, such as a BLE or ZigBee transceiver. In an example scenario, power supply unit 202 may supply the wireless signal as part a sweep of a room or other location. Alternately, an omnidirectional wireless signal may be provided.

At block 304, the at least one device 102 is authenticated, receives an authorization, or is otherwise involved in an establishment of trust between the device 102 and other devices and/or a network. In an example embodiment, device 102 and wireless power supply unit 202 (or another transceiver) may perform a series of communication exchanges allowing wireless power supply unit 202 (or another transceiver) to confirm or authenticate that it is, in fact, communicating with device 102. It will be appreciated that any suitable authentication method or standard may be employed. For example, Wi-Fi Protected Access (WPA), Wi-Fi Protected Access II (WPA2), Wired Equivalent Privacy (WEP) or some other authentication protocol may be used.

Once the device 102 is authenticated by wireless power supply unit 202 (or another transceiver), additional power for general operation of device 102 may be provided to the device 102. For example, the wireless power supply unit 202 can store the location of the device 102 and periodically supply device 102 with power sufficient for normal operations. If the device 102 is not authenticated, power may be withdrawn from the device. For example, the wireless power supply unit 202 can avoid powering the region containing device 102.

If at block 304, the power supply unit 202 (or another transceiver) has authenticated the device 202, at block 306, the power supply unit 202 adjusts the wireless signal to power the at least one device 102. The amount of power provided by the signal can be adjusted spatially (by changing where a power supplying signal is sent) or temporally (by changing how often a power supplying signal is sent). In an example embodiment, the wireless power supply unit 202, which may be adapted to also operate as a Wi-Fi access point, may use beamforming to communicate the signal. In an example embodiment, the wireless power supply unit 202 may maintain in memory 208 a map of physical areas or regions to be provided with the wireless signal. Regions may be mapped to indicate whether or how often a signal should be provided into that region. Wireless power supply unit 202 may rely upon the stored information in determining how and where to communicate signals.

If at block 304 the device 202 is not authenticated, at block 306, the wireless signal may be adjusted to avoid the at least one device. Alternately, the device 202 can be provided power to reattempt authentication. The signal can be adjusted spatially or temporally. For example, power supply 202 may adjust the transmission of power signals so as to avoid the particular device that has not been authenticated.

Figure 4:
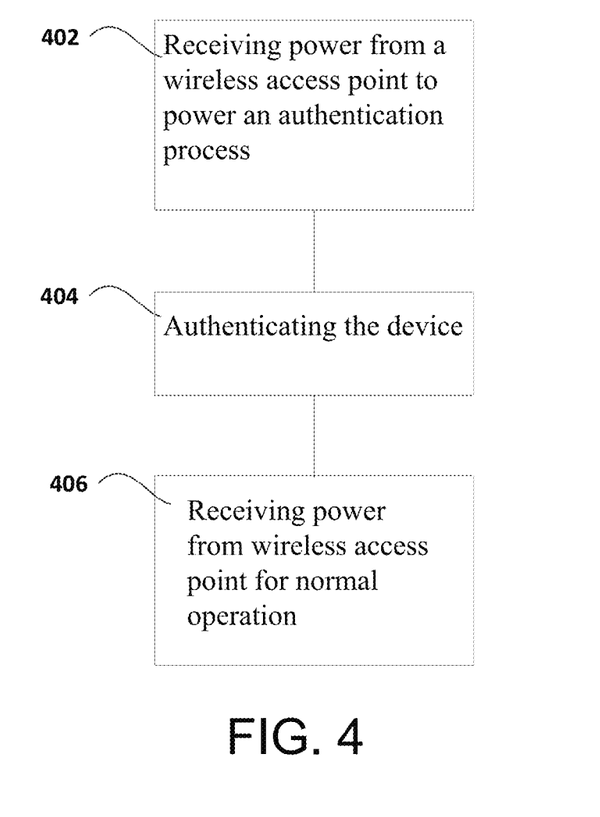
FIG. 4 is a flow diagram depicting example processing performed at a device.

FIG. 4 illustrates a method of operation at a device 102. The device 102 may be a device without a dedicated power supply that at block 402, the device 102 receives from power supply/Wi-Fi access point 202 a signal with sufficient power for the device 102 to perform an authentication process with the power supply 202 or another network device or service. The provided power may be limited to an amount that needed to perform authentication. In one embodiment, the provide power is insufficient for normal operation.

After receiving power to authenticate, at block 404, device 102 communicates with the power supply/Wi-Fi access point 202 (or another transceiver) in an attempt to authenticate itself. Authentication may be performed using any suitable type of authentication. For example, Wi-Fi Protected Access (WPA), Wi-Fi Protected Access II (WPA2), Wired Equivalent Privacy (WEP) or some other authentication protocol may be used.

At block 406, assuming it has been authenticated, device 102 receives additional power from power/supply/wireless/ Wi-Fi access point 202 for use in normal operations of device 102. This additional power may be provided in a signal, such as a dedicated power signal or a data signal. The wireless signal may be adjusted to power the particular device which may be one of a plurality of devices. In an example embodiment, the spatial adjustment may be performed by beamforming using the wireless power supply unit 202 acting as a wireless access point.

In one embodiment, power from signals, such as WiFi signals, are accumulated by device 102. Power storage elements such as capacitors and the like can be used to store power.

The device 102 can use the power from the power supplying device to send authentication messages to another location or using a separate protocol. In one example, the stored power may be only sufficient to allow a response over Bluetooth LE (BLE) or ZigBee instead of WiFi. In this embodiment, an authentication request over BLE or ZigBee can be done instead of WiFi.

Alternately, a "knock knock" request over BLE or ZigBee can be used to ask to get power faster to make authentication request e.g. over WiFi (which is a multi-step expansion of blocks 304/306 and 404/406).

Figure 5:
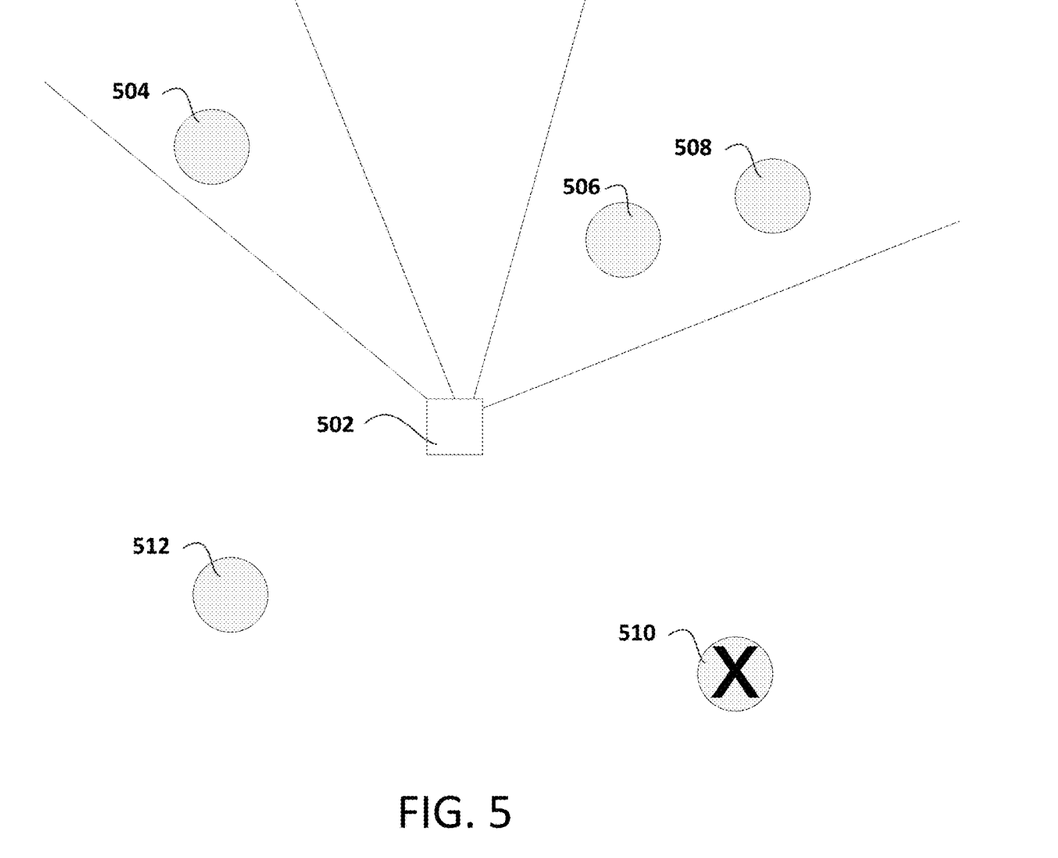
FIG. 5 depicts an example physical area with a plurality of devices in proximity of a wireless access point.

FIG. 5 illustrates an example using methods such as those of FIGS. 3 and 4. In an example scenario, when the devices 504, 506 and 508 are authenticated, the wireless access point 502 can adjust the wireless signal in order to provide power to the device for normal operations. The wireless access point 502 may maintain in memory a mapping of regions to which it should supply a wireless signal using beamforming or some other technique to supply power to devices 504, 506, and 508. The mapping can be stored locally or remotely. Device 510, which may have failed authentication by access point 502 (or by some other transceiver), does not receive a power signal from access point 502 and may eventually lack power to continue to operate. New devices such as, for example, device 512, may be added to the physical area, e.g., installed by a user or moved into the area by a user. The device 512 may be detected by sweeps of the region performed by access point 502 using beam shifting or by doing a period of omnidirectional wireless transmissions.

Omnidirectional signals can include signals sent in all directions, beam shifting can include directional signals. Beam shifting may be achieved by combining elements in a phased array in such a way that signals at particular angles (and thus regions in space) experience constructive interference.

Figure 6A:
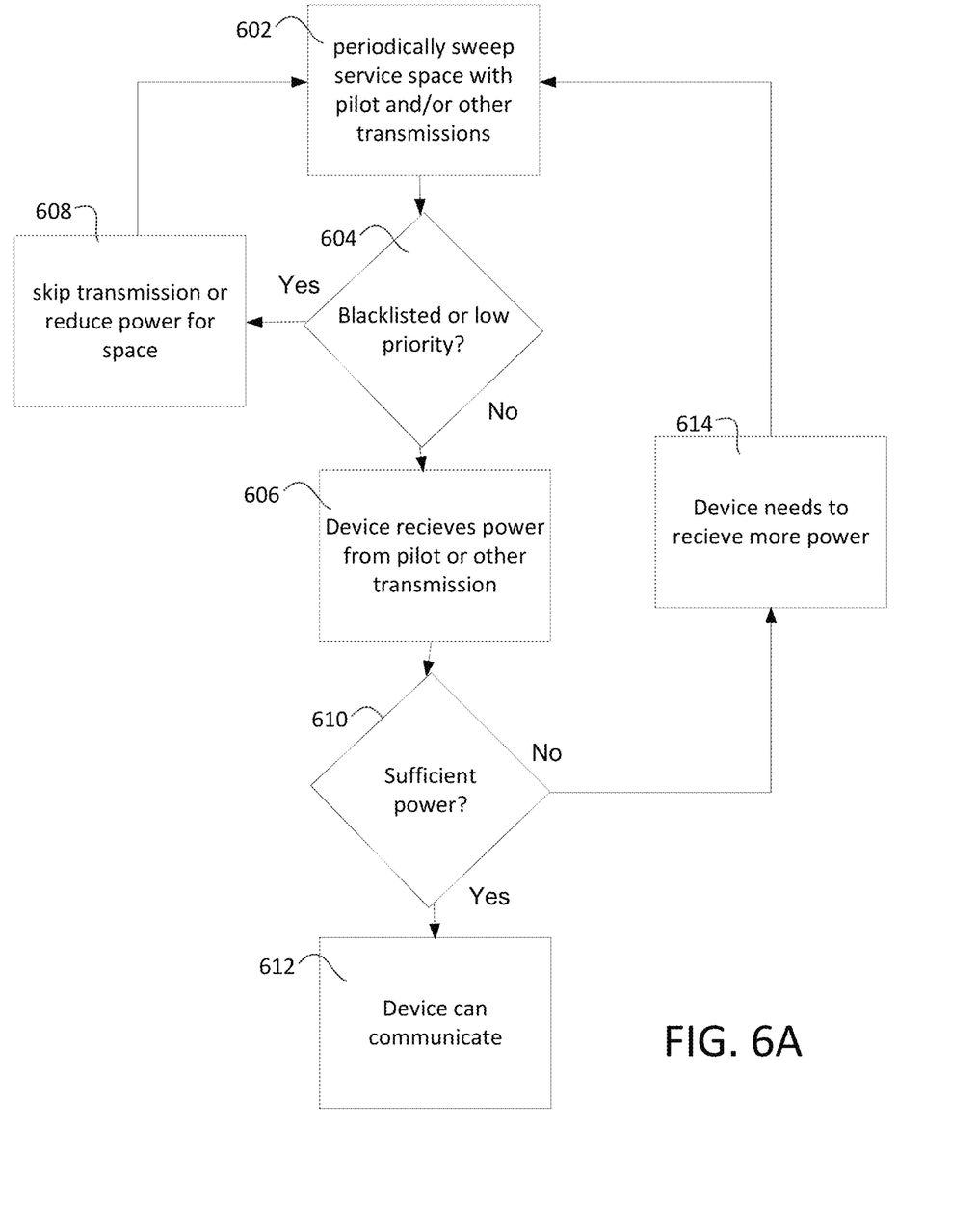
FIG. 6A is a flow diagram depicting exemplary processing for providing power to a device.

FIG. 6A illustrates an exemplary method of providing power to a device.

At block 602, a computing device, such as a power providing or monitoring device, such as wireless power unit 202 of FIG. 2, sweeps the service space with a pilot (e.g., a signal without data) or some other transmission such as a data signal. The sweep of the service space can provide power to devices to allow them to identify and or authenticate themselves.

At block 604, for each device identified in the service space, unit 202 determines whether the device is blacklisted or is otherwise a device that is not supposed to communicate with other devices on the network because, for example, it failed authentication, of low priority, not compatible, or any other reason.

If a device is determined to be blacklisted or otherwise of low priority, at block 608, the power provider 202 may skip transmission to, or reduce power provided to a space containing the device. Power provider unit 202 may store information identifying a level of power (if any) that should be provided to a device along with a mapping that indicates the power to be provided to different sectors or spaces.

If at block 604 a particular device was determined not to be blacklisted or otherwise designated as low priority, at block 606, the power provider unit 202 transmits and the particular device receives power.

At block 610, the power provider unit 202 determines whether the device has enough power to communicate. If so, at block 612, the device can communicate when it receives sufficient power. The communication can be with the wireless power provider 202 or with another transceiver using a protocol such as BLE or ZigBee.

If not, at block 614, the power provider unit 202 determines that the device needs to absorb more power and continues processing at block 602.

Figure 6B:
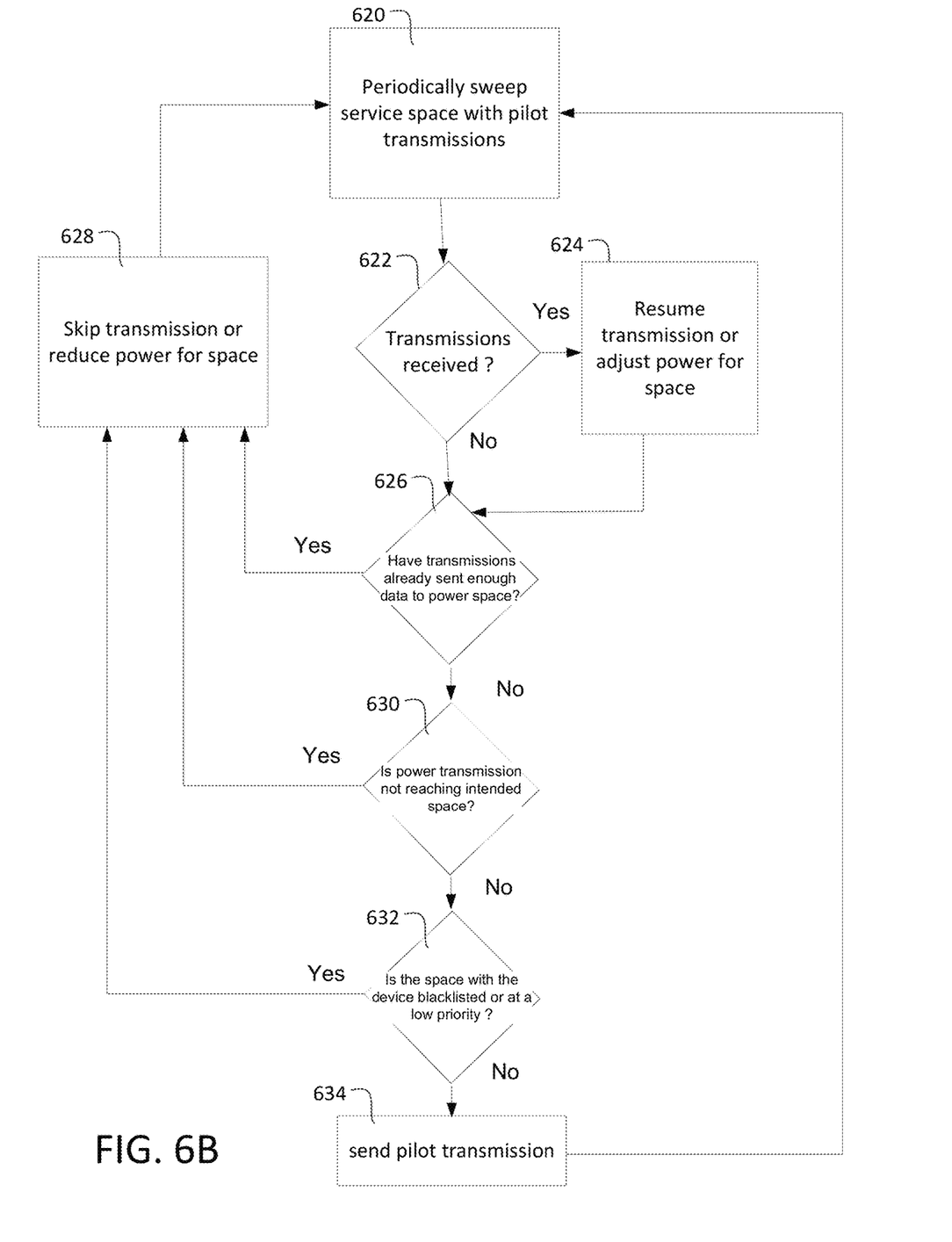
FIG. 6B is a flow diagram depicting an exemplary processing for periodically sweeping regions with wireless power for devices.

FIG. 6B illustrates an exemplary method of periodically sweeping regions with wireless power for devices. As shown in this example, the provided wireless power can be adjusted in each sector. For example, wireless power can be boosted or resumed when transmissions from a sector are received; and wireless power can be reduced when enough power has been supplied or when the space is blacklisted or low priority.

At block 620, a power provider such as unit 202 can periodically sweep the service space with pilot transmissions.

At block 622, the unit 202 determines if relevant transmissions have been received from this space. If so, at block 624 the power provider may resume transmission or adjust power for the space from which relevant transmissions have received from the device.

At block 626, the unit 202 determines whether other transmissions such as, for example, those transmitting data, have previously sent enough data to power space. If it is determined that sufficient power has not previously been sent, at block 630, the unit 202 determines whether power transmission is not reaching intended space. If it is determined that power transmissions are likely not reaching the intended space, at block 632, the unit 202 determines if the space with the device is blacklisted or at a low priority. If it is determined that the space is not blacklisted or at a low priority, at block 634, the unit 202 sends a pilot transmission. Processing then continues at block 620.

If any of the determinations at blocks 626, 630 and 632 are positive, processing continues at block 628, where the power provider 202 may skip transmission or reduce power for space. Processing then continues at block 620.

In an example embodiment, devices may be classified in one of three categories: 1. Authenticated devices that should be provided with communication and other capabilites, and power as appropriate; 2. Devices which failed authentication that should NOT be provided power or intercommunication; and 3. Devices which have not yet been authenticated which should be provided sufficient power to attempt authentication. Depending upon the classification of a particular device, the system steers intercommunication and power to given volumes.

In order to accommodate the first category of devices, the system may provide sufficient power delivery to volumes known to contain authenticated devices. Given that intercommunication itself provides power, power delivery may be as simple as performing normal intercommunication with the understanding and/or acknowledgment that said transmissions deliver enough power. Alternatively, power delivery may be as complex as tracking the estimated power delivered by prior communications and further sending a minimum amount of additional intercommunication to authenticated devices, which may include signals crafted to deliver higher power but no meaningful data payload to the device.

In order to accommodate the second category of devices, the system may ignore devices that failed authentication in order to avoid further delivery of power to the unauthenticated devices. The system may actively avoid transmitting energies into volumes containing devices that failed authentication, which may alter the typical beamforming decisions for best transmission to authenticated devices.

In order to accommodate the third category of devices, the power distribution scheme may provide at least intermittent/residual power delivery to locations that are not known to contain authenticated devices. This may be done by means as simple as intermittent omnidirectional transmission, or as complicated as tracking the energy transmitted to certain volumes and assigning beamforming paths to transmit into regions insufficiently "painted" by previous/recent transmissions, effectively performing "trickle feed" transmissions.

It may be desirable for devices to send an initiation signal to the system indicating that the device is trying to amass enough power to attempt authentication. When the system receives such a signal (if it is not determined to be from an unauthorized device or occurring too frequently from a device never attempting authentication (i.e. a power leech)), the system may decide to direct more transmission energy to that device or toward that volume in order to reduce the overall time to receive sufficient power.

It may be advantageous to link these concepts, so the initiation signal is a device's response to a system challenge provided in the "trickle feed" power delivery transmission, which could contain cryptographic or computed data useful in authentication; if the system confirms validity of the signal, it initiates further intercommunications and power delivery to "energize" the authenticated device.

FIGS. 7A-D illustrate exemplary mappings of power distribution and energy needs over an area, which may be an indoor or outdoor area such as dwelling, office space, park, sports complex, etc. The squares depicted in FIGS. 7A-D corresponded to sectors which can be provided a signal. It will be appreciated that while the sectors are depicted as squares, the sectors may be angular regions in space.

The darkness of shading applied to the boxes indicates the level of power sent (or needed to be sent) to the particular sector. A triangle identifies a device without a dedicated power supply. A circle with a slash indicates a blocked area. A question mark indicates an area that may not have been fully powered.

Figure 7A:
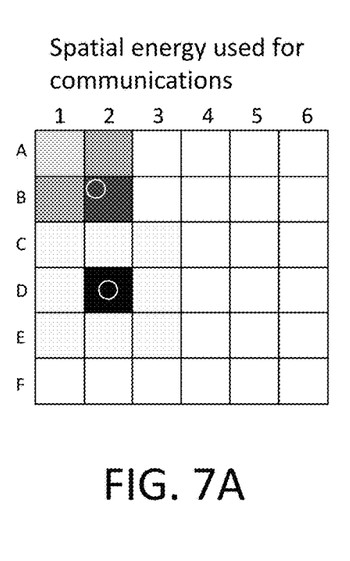
FIGS. 7A-D are diagrams that illustrate power usage and power needs in a physical area.

FIG. 7A illustrates energy levels used by devices in a prescribed area. In the scenario depicted in FIG. 7A, two devices, such as user devices or clients, one in sector B2 and one in sector D2, are using communications. The client in sector B2 is not in the center of the area. As a result, energy communicated to the client bleeds into the surrounding areas as indicated by the shading applied to the adjacent sectors. The client in sector D2 is located in the center of the area, but, as indicated by the darkness of the region, high concentration of energy is communicated to the sector. As a consequence, energy bleeds into surrounding areas.

Figure 7B:
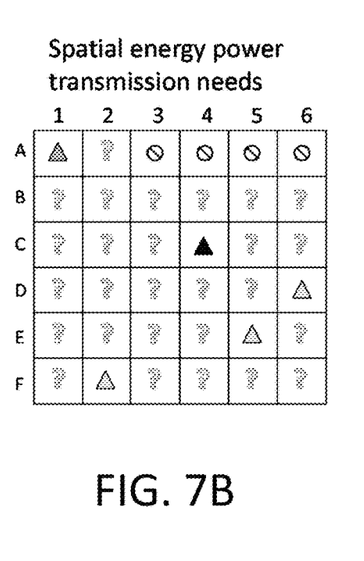

FIG. 7B illustrates power transmission needs of various devices in the predetermined area. In the scenario depicted in FIG. 7B, five devices without dedicated power supplies, depicted with triangles, have varying levels of need for power as indicated by the varying levels of shading applied to the triangles. Five sectors (A3-6), depicted using circles with a slash, have been blocked. Other areas, indicated by question marks, may contain devices that have not accumulated the power needed to ask for power. These devices should receive minimal "trickle" power.

Figure 7C:
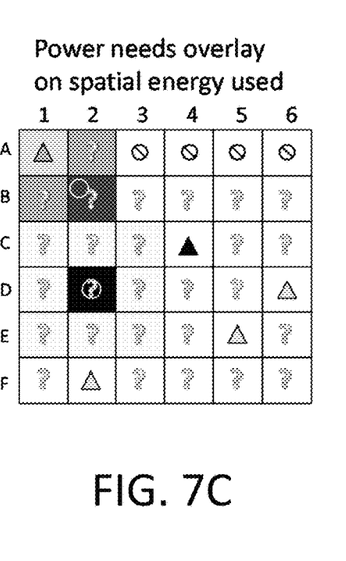

FIG. 7C illustrates an overlay of the power needs as depicted in FIG. 7B on the spatial energy used as depicted in FIG. 7A. As shown in FIG. 7C, although some areas have power needs met (e.g., sectors A2, B1-2, C1-3, D1-3, E1-3), many areas need more energy (often just a "trickle").

Figure 7D:
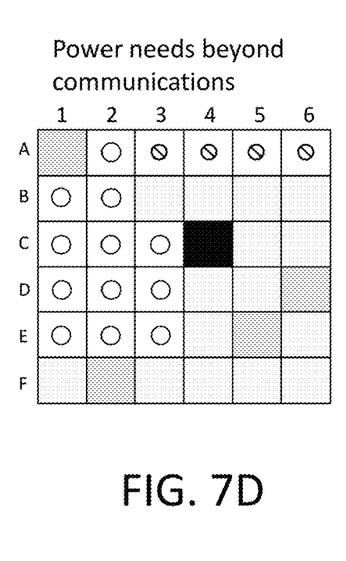

FIG. 7D shows that there are power needs beyond communications requirements to cover. For example, the sectors containing devices without dedicated power supplies (A1, C4, D6, E5 and F2) may need to have some additional power provided beyond that provided for the devices in sectors B2 and D2. The circle symbol, in FIG. 7D, is used to denote areas that do not need more power.

FIGS. 8-11 illustrate embodiments concerning providing indications to a sender of wireless signals so that these wireless signals can be adjusted. The signals can be adjusted spatially or temporally adjusted.

Figure 8:
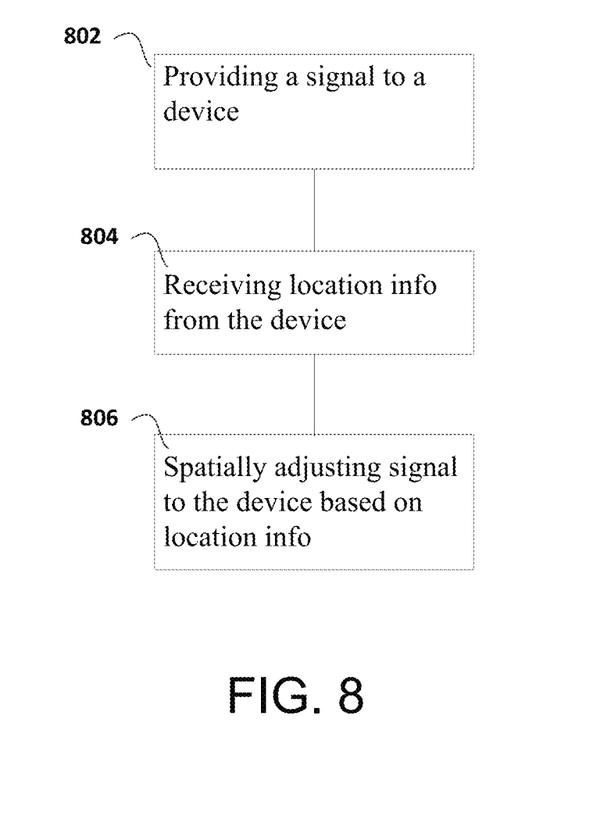
FIG. 8 is a flow diagram of exemplary processing for adjusting wireless signals.

FIG. 8 illustrates a first exemplary method for determining location information for a device, such as, for example, a device that needs to be powered. In an example scenario, a power provider may use the location information, for example, to update its transmissions. The location processing may be implemented by any suitable device including, for example, a wireless access point or a wireless power supplying device.

At block 802, a signal is provided to a device. The signal may be, for example, a power or wireless signal. The device that receives the signal may be an actively powered device or a device without its own power supply.

At block 804, location info is received from the device. The location information may be any suitable information with which location may be determined including, for example, an accelerometer reading or position indication. Based on the location information, the sender of wireless power determines the current or future location of the device. The location info can be sent to wireless power supply unit 202 or to another transceiver, such as a BLE or ZigBee transceiver, in communication with wireless power supply unit 202.

At block 806, signal to the device is adjusted based on location info. The signals can be adjusted spatially or temporally. For example, beam shifting may be used by a wireless or power provider to provide a signal to the current or future location of the device.

Figure 9:
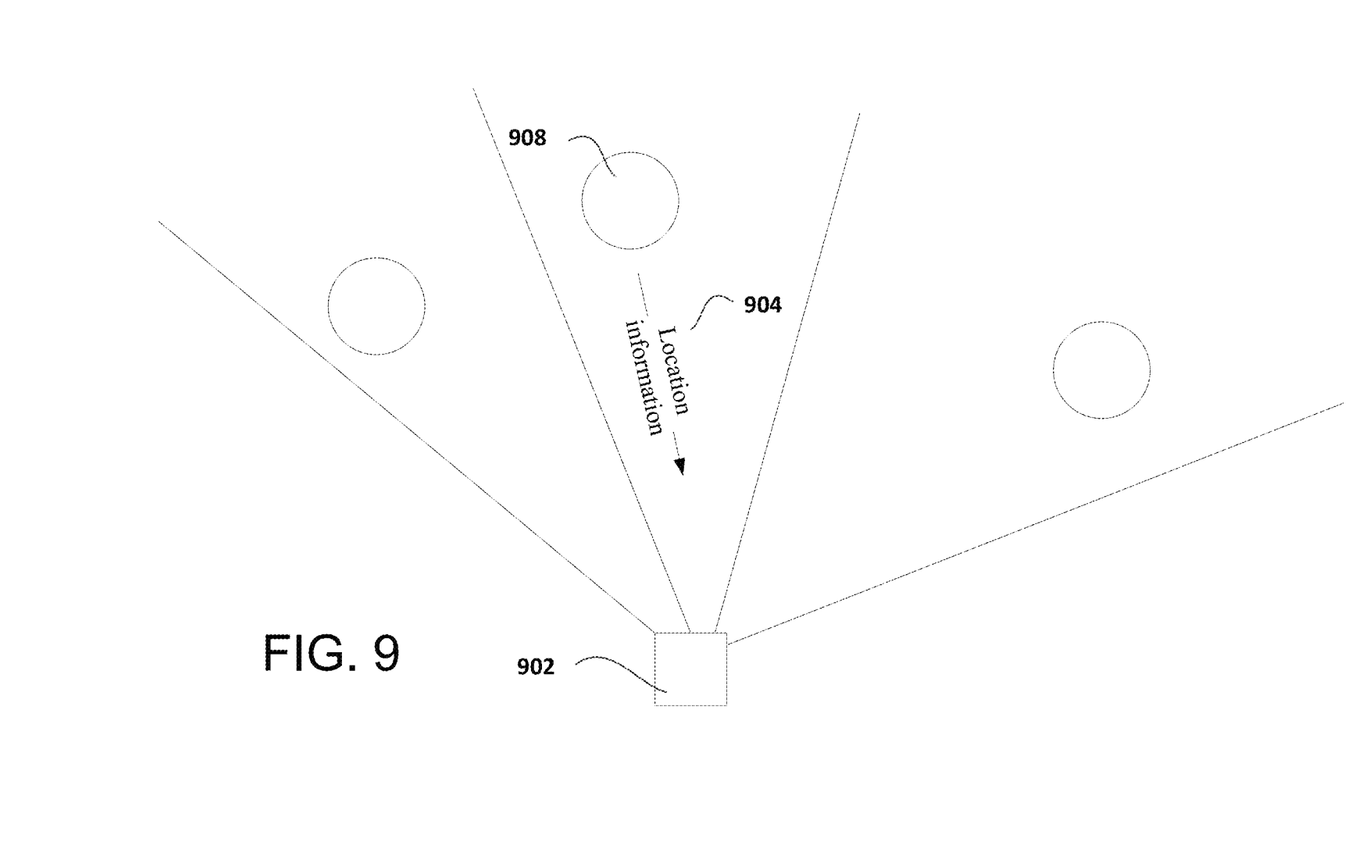
FIG. 9 depicts an example physical area with a plurality of device in proximity to a wireless access point.

FIG. 9 illustrates the example location processing of FIG. 8. In the example scenario depicted in FIG. 9, device 908 indicates to sender 902 that it has moved by communicating location information 904. The sender 902, which may be an access point or wireless power provider, uses the location information to adjust which sectors are provided data or power.

Figure 10:
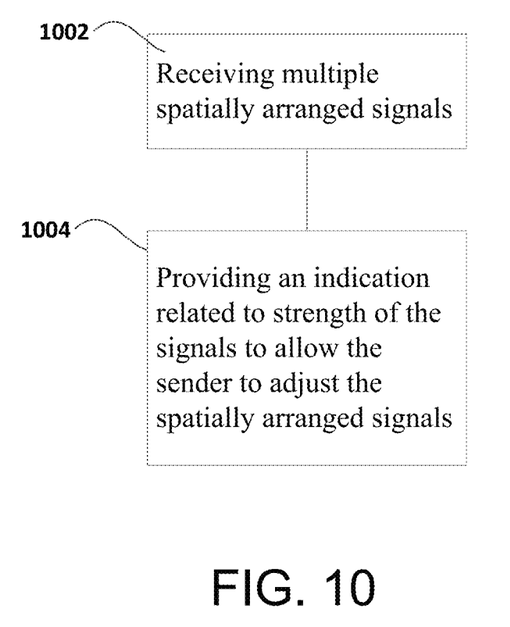
FIG. 10 is a flow diagram of example processing for adjusting wireless signals.

FIG. 10 illustrates a second exemplary method for determining location of a device. This method describes another way for a power provider or wireless access point to determine that it should update its transmissions. The location processing may be implemented by any suitable device including both actively powered devices and devices without their own dedicated power supply.

At block 1002, multiple signals are received at a device. The multiple signals may be provided at different times or concurrently. The signals can be adjusted spatially or temporally. The signals may be wireless signals or power signals. The device analyzes the strength of the received signals to determine the stronger signal.

At block 1004, an indication related to strength of the signals is provided to the sender of the signals in order that the sender may adjust the signals. For example, a time stamp of the stronger signal may be used if the signals are not concurrent. Alternately, the signals may include a signal ID which can be provided back to the signal provider by the device. The sender may then adjust the signal in response to the information. The signals can be adjusted spatially or temporally. The indication can be sent directly to wireless power supply unit 202 or to another transceiver, such as a BLE or ZigBee transceiver, in communication with wireless power supply unit 202.

Figure 11:
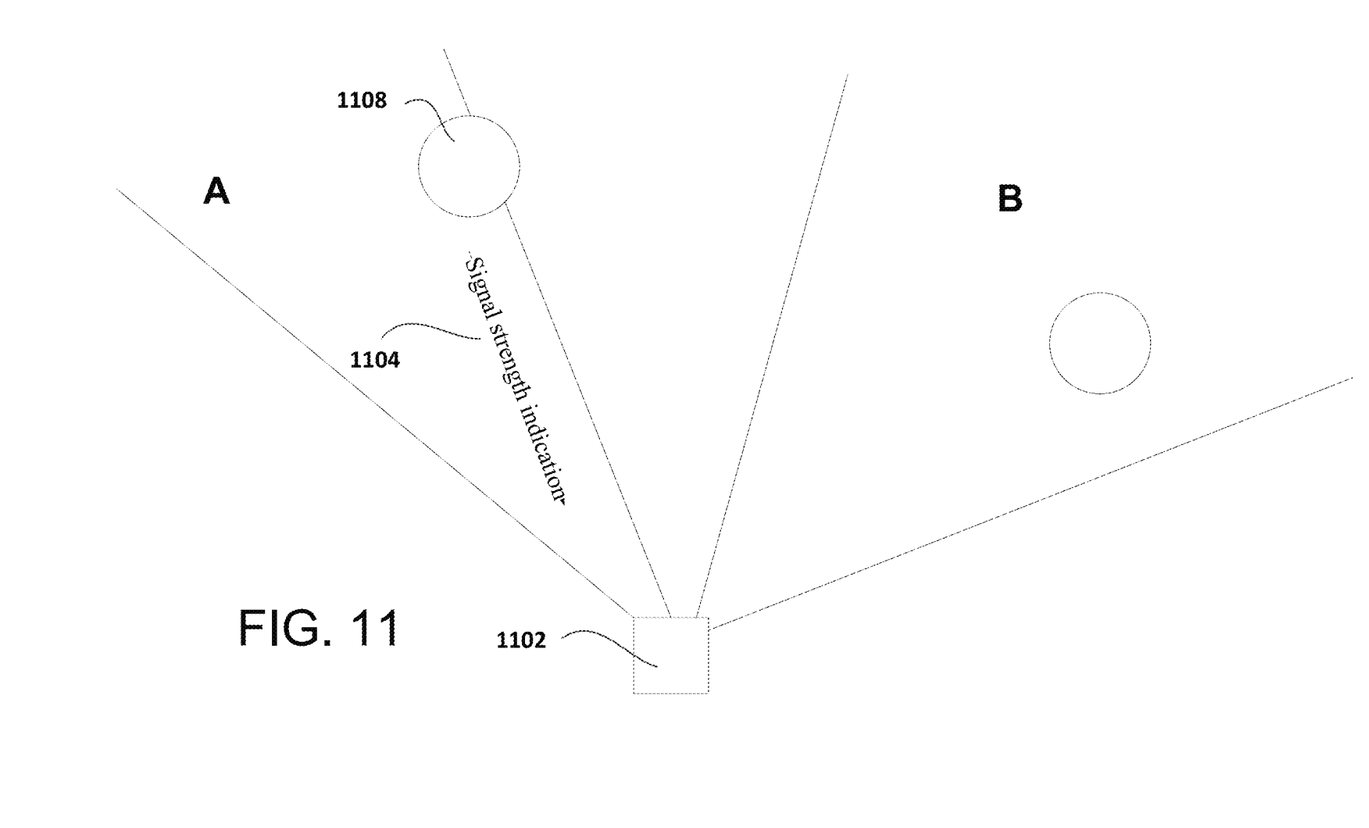
FIG. 11 depicts an example physical area with a plurality of device in proximity to a wireless access point.

FIG. 11 illustrates an example of the location processing of FIG. 10. In the example scenario depicted in FIG. 11, sender 1102 sends signals into regions A and B. Device 1108 indicates to the sender 1102 with a signal strength indication

1104 which of the signals is stronger. The sender 1102 can then adjust the region in which a signal is sent into.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, may be implemented by special purpose hardware-based computer systems that perform the specified functions or steps, or combinations of special purpose hardware and computer instructions.

It will be apparent to those skilled in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
   transmitting, by a computing device, a plurality of wireless signals, wherein each wireless signal is configured to supply power to one or more devices to enable the one or more devices to perform authentication, and wherein each wireless signal is transmitted with a signal identifier associated with the wireless signal;

receiving, by the computing device and from at least one of the one or more devices, an indication of the signal identifier associated with one of the plurality of wireless signals; and adjusting, by the computing device and based on the received indication, the wireless signal associated with the indicated signal identifier to provide the at least one of the one or more devices with power for normal operation.

2. The method of claim 1, wherein the wireless signal associated with the indicated signal identifier is spatially adjusted or temporally adjusted.

3. The method of claim 1, wherein the at least one of the one or more devices does not have a dedicated power supply.

4. The method of claim 1, wherein each of the plurality of wireless signals is transmitted into a different region.

5. The method of claim 1, wherein in addition to the indication of the signal identifier of the one of the plurality of wireless signals, the computing device receives a signal strength indicator associated with the one of the plurality of wireless signals.

6. The method of claim 1, wherein the computing device comprises a wireless access point.

7. The method of claim 6, wherein the at least one of the one or more devices is configured to communicate with the wireless access point.

8. A non-transitory computer-readable medium storing instructions that, when executed, cause:

transmitting a plurality of wireless signals, wherein each wireless signal is configured to supply power to one or more devices to enable the one or more devices to perform authentication, and wherein each wireless signal is transmitted with a signal identifier associated with the wireless signal;

receiving, from at least one of the one or more devices, an indication of the signal identifier associated with one of the plurality of wireless signals; and adjusting, based on the received indication, the wireless signal associated with the indicated signal identifier to provide the one of the one or more devices with power for normal operation.

9. The non-transitory computer-readable medium of claim 8, wherein the wireless signal associated with the indicated signal identifier is spatially adjusted or temporally adjusted.

10. The non-transitory computer-readable medium of claim 8, wherein the at least one of the one or more devices does not have a dedicated power supply.

11. The non-transitory computer-readable medium of claim 8, wherein the instructions that, when executed, cause the transmitting the plurality of wireless signals, cause each of the plurality of wireless signals to be transmitted into a different region.

12. The non-transitory computer-readable medium of claim 8, wherein the instructions, when executed, further cause, in addition to the receiving the indication of the signal identifier associated with the one of the plurality of wireless signals, receiving a signal strength indicator associated with the one of the plurality of wireless signals.

13. A system comprising:
at least one device configured to determine a signal strength associated with wireless signals received by the at least one device; and
a computing device configured to:
transmit a plurality of wireless signals, wherein each wireless signal is configured to supply power to the at least one device to enable the at least one device to perform authentication, and wherein each wireless signal is transmitted with a signal identifier associated with the wireless signal;
receive, from the at least one device, an indication of the signal identifier associated with one of the plurality of wireless signals determined by the at least one device to have a strongest signal strength; and
adjust supply, based on the received indication, the wireless signal associated with the indicated signal identifier to provide the at least one device with power for normal operation.

14. The system of claim 13, wherein the wireless signal associated with the indicated signal identifier is spatially adjusted or temporally adjusted.

15. The system of claim 13, wherein the at least one device does not have a dedicated power supply.

16. The system of claim 13, wherein the computing device is further configured to transmit each of the plurality of wireless signals into a different region.

17. The system of claim 13, wherein in addition to the indication of the signal identifier associated with the one of the plurality of wireless signals, the computing device receives a signal strength indicator, determined by the at least one device, associated with the one of the plurality of wireless signals.

18. The system of claim 13, wherein the computing device comprises a wireless access point.

19. The system of claim 18, wherein the at least one device is configured to communicate with the wireless access point.

\* \* \* \* \*